United States Patent [19]
Perry

[11] Patent Number: 5,610,632
[45] Date of Patent: Mar. 11, 1997

[54] DEVICE FOR SECURING A MOUSE BALL

[76] Inventor: Robert C. Perry, 5755 SW. Willow La., Lake Oswego, Oreg. 97035-5340

[21] Appl. No.: 546,227

[22] Filed: Oct. 20, 1995

[51] Int. Cl.⁶ ........................................... G09G 5/08
[52] U.S. Cl. .............................. 345/163; 345/156
[58] Field of Search .................... 345/163, 164, 345/165, 166, 167; 74/471 Y; 273/148, 438

[56] References Cited

U.S. PATENT DOCUMENTS

| | | | |
|---|---|---|---|
| 4,612,539 | 9/1986 | Hosogoe et al. | 345/164 |
| 4,933,670 | 6/1990 | Wislocki | 345/167 |
| 5,457,479 | 10/1995 | Cheng | 345/167 |
| 5,486,845 | 1/1996 | Chait | 345/163 |

*Primary Examiner*—Mark R. Powell
*Assistant Examiner*—Matthew Luu
*Attorney, Agent, or Firm*—Smith-Hill and Bedell

[57] ABSTRACT

A computer mouse comprises a housing having a bottom wall that defines an opening, a retainer plate fitted in the opening and formed with a circular hole, and a mouse ball in the housing and projecting through the circular hole. A seal adheres to both the bottom wall of the housing and the retainer plate, whereby removal of the retainer plate from the opening is resisted.

19 Claims, 1 Drawing Sheet

DEVICE FOR SECURING A MOUSE BALL

BACKGROUND OF THE INVENTION

This invention relates to a device for securing a mouse ball.

A computer mouse is widely used as a pointing device with personal computers. A common form of computer mouse comprises a housing for gripping in the user's hand, the housing having a bottom wall that slides over a mouse pad. The bottom wall of the housing is formed with an opening that contains a removable retainer plate, and the retainer plate is formed with a circular hole. The diameter of the circular hole in the retainer plate is somewhat smaller than the diameter of the mouse ball, and so the mouse ball is held captive in the housing but protrudes through the hole in the retainer plate.

The retainer plate can be easily removed, often simply by rotating the retainer plate in a counterclockwise direction, and the mouse ball can then be removed. This feature is advantageous because it allows the mouse ball to be removed for cleaning without need for special tools. However, in some respects this feature can also be a disadvantage, particularly when applied to a computer mouse that is used in a school, because if the mouse ball can be easily removed for cleaning by a teacher or technician, it can also be easily removed by a curious or bored student whose plans do not include cleaning and replacing the mouse ball. If unauthorized removal of a mouse ball is not detected by a teacher or other person having reason to ensure that the mouse ball is promptly replaced, the ball might be misplaced and it might then be necessary to obtain either a new mouse ball or replace the entire mouse.

SUMMARY OF THE INVENTION

In accordance with the invention there is provided a computer mouse comprising a housing having a bottom wall that defines an opening, a retainer plate fitted in the opening and formed with a circular hole, a mouse ball in the housing and projecting through the circular hole, and a seal that adheres to both the bottom wall of the housing and the retainer plate, whereby removal of the retainer plate from the opening is resisted.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
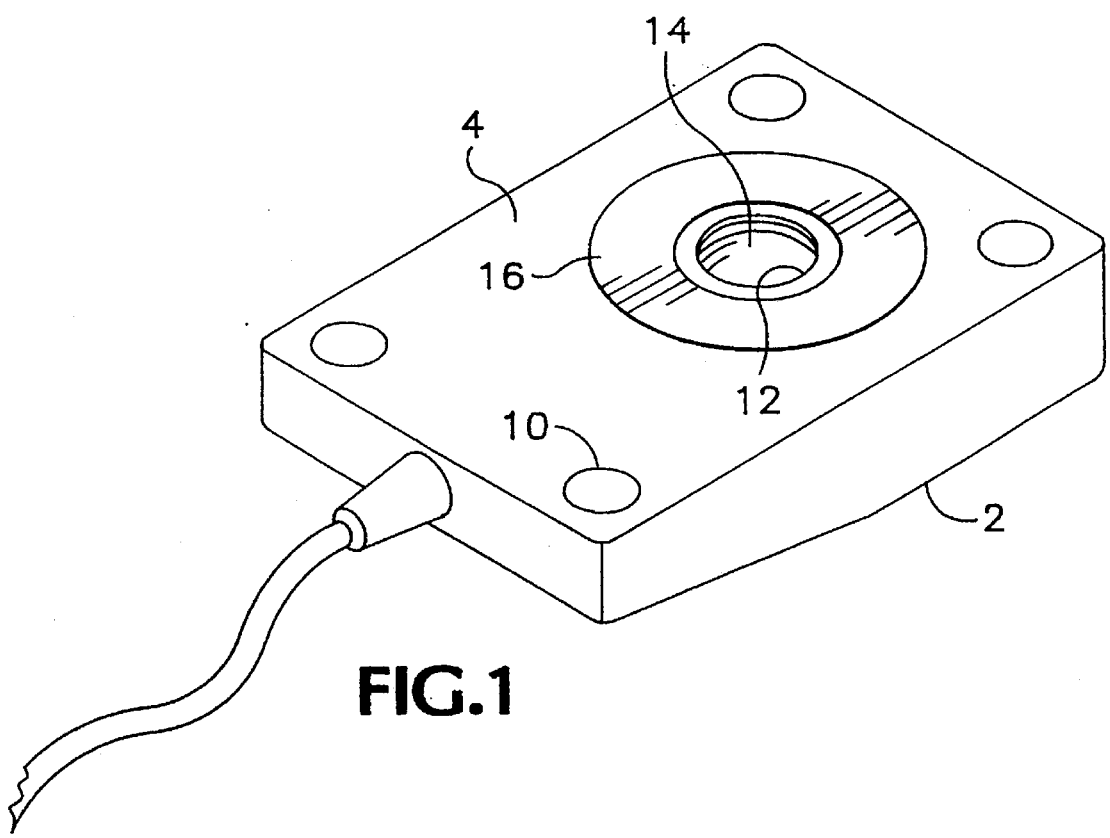
FIG. 1 is a bottom perspective view of a computer mouse in accordance with the present invention.
Figure 2:
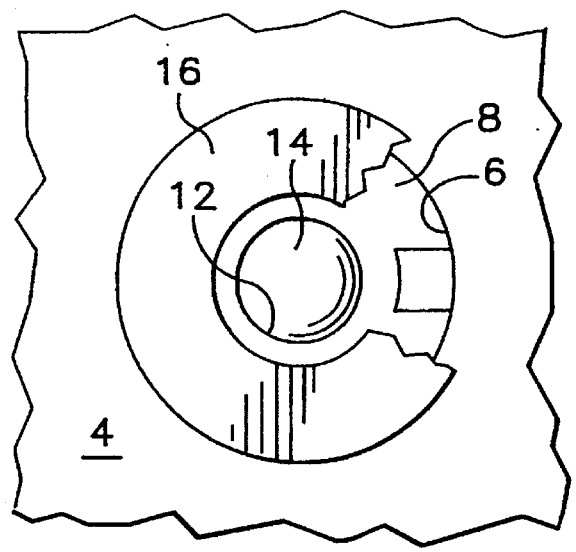
FIG. 2 is a bottom partial plan view of the mouse shown in FIG. 1, with the seal shown partly broken away.

The computer mouse shown in the drawings comprises a housing 2 having a bottom wall 4 that is formed with a circular opening 6 that is about 1.4 inch (3.6 cm) in diameter and receives a retainer plate 8. The housing 2 and the retainer plate 8 are made of a synthetic polymer material. Raised feet 10 project from the bottom wall 4 and slide on a mouse pad or other driving surface when the mouse is in use for supporting the mouse with the main area of the bottom wall above the driving surface. The feet 10 may include inserts (not shown) of PTFE or other low friction material. The retainer plate is coupled to the bottom wall of the housing using a bayonet-type coupling. By rotating the retainer plate through an angle of about 45° in the counter-clockwise direction, the plate can be disengaged from the bottom wall. Similarly, the plate can be re-engaged with the bottom wall by positioning the plate in the proper angular position relative to the bottom wall, inserting the plate in the opening, and then rotating the plate through about 45° in the clockwise direction. The retainer plate is formed with two diametrically opposed molded formations, one of which (designated 11) can be seen in FIG. 2. The molded formations may include arrows indicating the direction in which the retainer plate must be rotated in order to disengage it from the bottom wall of the mouse housing and/or ribs to allow rotational force to be applied to the retainer plate.

The removable retainer plate is formed with a circular hole 12 that is about 0.5 inch (1.3 cm) in diameter and allows the mouse ball 14 to project from the housing while remaining captive within the housing. When the retainer plate is removed, the mouse ball can be removed from the housing.

In order to resist unauthorized removal of the retainer plate, an annular seal 16 of self-adhesive material is applied to the bottom wall of the mouse housing and to the retainer plate. The inner diameter of the annular seal is about ⅝ inch (1.6 cm) and its outer diameter is about 1¾ inch (4.4 cm). Thus, the internal diameter of the annular seal is greater than the diameter of the hole in the retainer plate, and the external diameter of the annular seal is greater than the diameter of the opening in the bottom wall of the housing. Therefore, when the seal is applied to the bottom surface of the mouse, with the hole in the annular seal concentric with the hole in the retainer plate, the seal adheres to both the retainer plate and the bottom wall of the housing, and the retainer plate 8 cannot be turned in the opening 6 so long as the seal 16 remains intact and in position. The seal is opaque, so that molded formations or indicia on the retainer plate that provide instruction on removal of the retainer plate are not visible while the seal remains intact and in position.

Preferably, the seal is made of a tough synthetic polymer material, such as the 0.02 inch (0.05 cm) thick self adhesive silver film material that is sold by 3M Corporation under the designation Mylar 7872 or the 0.04 inch (0.1 cm) thick self adhesive vinyl film that is sold by Vasson under the designation 41196. The adhesive on the film adheres strongly to the material of the mouse housing, so that the seal is resistant to removal. The Mylar film is hard wearing and is therefore preferred for applications in which the mouse does not have feet, such that the seal runs directly on the driving surface when the mouse is in use. The vinyl film conforms well to an uneven surface and is therefore preferred when the bottom wall of the housing or the retainer plate is formed with ridges or other projections that might impair secure attachment of the seal. The vinyl film tends to break up when it is peeled off a surface to which it has been attached, so that it is difficult to remove the seal in one piece, and this feature may be advantageous with regard to preventing unauthorized removal of the seal.

It will be appreciated that the invention is not restricted to the particular embodiment that has been described, and that variations may be made therein without departing from the scope of the invention as defined in the appended claims and equivalents thereof. For example, the invention is not restricted to use with a computer mouse in which the opening in the bottom wall of the housing is circular. It may, for example, be possible to employ a retainer plate that slides into and out of engagement with the bottom wall by linear, rather than rotational, movement, in which case the retainer plate would generally be substantially rectangular. The same configuration of seal could be used, so long as the seal adheres to both the bottom wall of the housing and the retainer plate without encroaching on the hole in the retainer plate.

I claim:

1. A computer mouse comprising:

a housing having a bottom wall that defines a circular opening, a retainer plate fitted in the opening and formed with a circular hole concentric with said opening, the retainer plate being attached to the bottom wall of the housing, a mouse ball in the housing and projecting through the circular hole, the mouse ball being of greater diameter than the circular hole, whereby the mouse ball is held captive in the housing by the retainer plate, and a seal that defines a circular hole that is concentric with the hole in the retainer plate, the seal being annular and having an inner diameter greater than the diameter of the hole in the retainer plate and less than the diameter of the opening, an outer diameter that is greater than the diameter of the opening, and wherein the seal adheres to both the bottom wall of the housing and the retainer plate, whereby removal of the retainer plate from the opening is resisted.

2. A computer mouse according to claim 1, wherein the seal is made of a self adhesive synthetic polymer film material.

3. A computer mouse according to claim 1, wherein the seal is made of an opaque material.

4. A computer mouse according to claim 1, wherein the retainer plate is attached to the bottom wall of the housing by mechanical engagement of at least one element of the retainer plate with an element of the bottom wall of the housing.

5. A computer mouse according to claim 2, wherein the retainer plate is attached to the bottom wall of the housing by mechanical engagement of at least one element of the retainer plate with an element of the bottom wall of the housing.

6. A computer mouse comprising:

a housing having a bottom wall that defines an opening, a retainer plate fitted in the opening and formed with a circular hole, the retainer plate being attached to the bottom wall of the housing, a mouse ball in the housing and projecting through the circular hole, the mouse ball being of greater diameter than the circular hole, whereby the mouse ball is held captive in the housing by the retainer plate, and a seal that adheres to both the bottom wall of the housing and the retainer plate, whereby removal of the retainer plate from the opening is resisted, wherein the seal has an inner periphery defining a hole and also has an outer periphery, and the circular hole in the retainer is wholly within the hole defined by the inner periphery of the seal and the opening defined in the bottom wall of the housing is wholly within the outer periphery of the seal.

7. A computer mouse according to claim 6, wherein the seal defines a circular hole that is concentric with the hole in the retainer plate.

8. A computer mouse according to claim 7, wherein the opening defined by the bottom of the housing is circular and is concentric with the circular hole in the retainer plate, and the seal is annular having an inner diameter greater than the diameter of the hole in the retainer hole and less than the diameter of the opening, and an outer diameter that is greater than the diameter of the opening.

9. A computer mouse comprising:

a housing having a bottom wall that defines a circular opening, a retainer plate fitted in the opening and formed with a circular hole, a mouse ball in the housing and projecting through the circular hole, and an annular seal having an inner diameter greater than the diameter of the hole in the retainer plate and less than the diameter of the opening, and an outer diameter that is greater than the diameter of the opening, the annular seal adhering to both the bottom wall of the housing and the retainer plate, whereby removal of the retainer plate from the opening is resisted.

10. A computer mouse according to claim 9, wherein the circular hole defined by the seal is-concentric with the circular hole in the retainer plate.

11. A computer mouse according to claim 9, wherein the circular opening defined by the bottom wall of the housing is concentric with the circular hole in the retainer plate.

12. A computer mouse according to claim 9, wherein the seal is made of a self-adhesive synthetic polymer film material.

13. A computer mouse according to claim 9, wherein the seal is made of an opaque material.

14. A computer mouse according to claim 9, wherein the retainer plate is attached to the bottom wall of the housing by mechanical engagement of at least one element of the retainer plate with an element of the bottom wall of the housing.

15. A method of modifying a computer mouse comprising a housing having a bottom wall that defines an opening, a retainer plate fitted in the opening and formed with a circular hole, and a mouse ball in the housing and projecting through the circular hole, said method comprising:

(a) providing a self-adhesive seal that has an inner periphery defining a hole that is at least as large as the circular hole in the retainer plate and also has an outer periphery, the seal having an extent such that when it is applied to the retainer plate with the hole in the retainer plate wholly within the hole in the seal, the seal extends at least partially over both the bottom wall of the housing and the retainer plate, and (b) applying the seal to the housing so that it adheres to both the bottom wall of the housing and the retainer plate, whereby removal of the retainer plate from the opening is resisted.

16. A method according to claim 15, wherein the opening defined by the bottom wall of the housing is circular and is concentric with the circular hole in the retainer plate, the seal provided in step (a) is annular, the hole defined by the inner periphery of the seal is circular and is of diameter greater than the circular hole in the retainer plate and less than the circular opening in the bottom wall, and the outer periphery is circular and is of diameter greater than the circular opening defined by the bottom wall.

17. A seal for a computer mouse that includes a housing having a bottom wall that defines an opening, a retainer plate fitted in the opening and formed with a circular hole, and a mouse ball in the housing and projecting through the circular hole, the seal comprising a sheet-form piece of self-adhesive film material defining a hole that is larger than the circular hole in the retainer plate, and wherein the seal has an extent such that when it is applied to the retainer plate with the hole in the seal concentric with the hole in the retainer plate, the seal adheres to both the bottom wall of the housing and the retainer plate, whereby removal of the retainer plate from the opening is resisted.

18. A seal according to claim 17, the seal being made of a synthetic polymer material.

19. A seal according to claim 18, the seal being made of an opaque material.

* * * * *